(12) United States Patent
Pan (10) Patent No.: US 8,853,901 B2
(45) Date of Patent: Oct. 7, 2014

(54) MOTOR ROTOR SYSTEM HAVING A MAGNETIC RING BRACKET

(75) Inventor: Mingpan Pan, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 397 days.

(21) Appl. No.: 13/346,694

(22) Filed: Jan. 9, 2012

(65) Prior Publication Data

US 2012/0104882 A1     May 3, 2012

Related U.S. Application Data

(63) Continuation-in-part of application No. 12/877,124, filed on Sep. 8, 2010.

(30) Foreign Application Priority Data

Mar. 9, 2010    (CN) .......................... 2010 1 0125891

(51) Int. Cl.
| | |
|---|---|
| H02K 11/00 | (2006.01) |
| H02K 1/28 | (2006.01) |
| H02K 1/30 | (2006.01) |
| H02K 9/06 | (2006.01) |
| H02K 29/08 | (2006.01) |
| H02K 1/27 | (2006.01) |
| H02K 9/02 | (2006.01) |
| H02K 1/32 | (2006.01) |

(52) U.S. Cl.
CPC .................. *H02K 1/278* (2013.01); *H02K 1/28* (2013.01); *H02K 1/30* (2013.01); *H02K 9/06* (2013.01); *H02K 1/32* (2013.01); *H02K 29/08* (2013.01)
USPC ............................... 310/68 B; 310/63; 310/51

(58) Field of Classification Search
CPC ............ H02K 11/001; H02K 11/0015; H02K 11/0021
USPC .................... 310/68 B, 51, 60 R–63, 402, 417
See application file for complete search history.

(56) References Cited

U.S. PATENT DOCUMENTS

| | | | | |
|---|---|---|---|---|
| 4,954,736 | A | * | 9/1990 | Kawamoto et al. ...... 310/156.21 |
| 6,013,961 | A | * | 1/2000 | Sakamaki et al. .......... 310/68 B |
| 2008/0143198 | A1 | * | 6/2008 | Bi et al. .......................... 310/51 |
| 2008/0284274 | A1 | * | 11/2008 | Bi .................................. 310/261 |
| 2009/0184608 | A1 | * | 7/2009 | Wong ........................... 310/68 B |
| 2009/0275273 | A1 | * | 11/2009 | Purohit et al. .................. 29/605 |

* cited by examiner

*Primary Examiner* — Michael Andrews
(74) *Attorney, Agent, or Firm* — Matthias Scholl P.C.; Matthias Scholl (57) ABSTRACT

A motor rotor system including: an axis of rotation, a rotor iron core mounted on the axis of rotation, a permanent magnet, a magnetic ring bracket, and a magnetic ring. The permanent magnet, the magnetic ring bracket, and the magnetic ring are mounted on the rotor iron core. The magnetic ring is sheathed on the magnetic ring bracket. The magnetic ring bracket is located at one end of the rotor iron core and connected with an end face of the rotor iron core. The motor rotor system has excellent batch-to-batch consistency, simple structure, and convenient installation. It is suitable for large batch production and can be controlled using sine-wave driving control methods with a position sensor.

7 Claims, 9 Drawing Sheets

MOTOR ROTOR SYSTEM HAVING A MAGNETIC RING BRACKET

CROSS-REFERENCE TO RELATED APPLICATIONS

This is a continuation-in-part of U.S. patent application Ser. No. 12/877,124, filed on Sep. 8, 2010, now pending. Pursuant to 35 U.S.C. §119 and the Paris Convention Treaty, this application also claims the benefit of Chinese Patent Application No. 201010125891.5 filed on Mar. 9, 2010. The contents of all aforementioned applications, including any intervening amendments thereto, are incorporated herein by reference in their entirety.

BACKGROUND OF THE INVENTION

1. Field of the Invention

The invention relates to a type of motor rotor system.

2. Description of the Related Art

Conventional brushless DC motors employ a position sensor (Hall element) to measure the position of a rotor so that a motor controller can send a timely phase change command. Now there appears a sine wave control mode with a position sensor. Under such a control mode, a main magnetic field of a motor rotor uses strong magnetism; therefore a driving control signal has a higher consistency requirement for motor counter EMF and Hall output signals. If the consistency is insufficient, an abnormal phenomenon will occur when a program used in one motor is used in another one. In a minor case, motor noise and vibration will be aggravated, efficiency will fall, and unique advantages of a sine-wave motor will be lost. In a serious case, a motor will jitter and lose synchronization. Present rotor systems also have the following problems: 1. if a first-level magnetic inductive ring is added behind a main magnetic field of a motor, the following problems will occur that relative position between the main magnetic field and the inductive magnetic field is not easy to be controlled and measurement accuracy will be affected due to low accuracy; 2. if an enterprise having a relatively good magnetizing process uses the main magnetic field and the inductive magnetic field together for magnetizing, it is not suitable for strong magnetic materials such as sintered NdFeB but low magnetic materials such as ferrite or bonded NdFeB because of limited process; 3. If an adjustable Hall component is mounted behind the rear cover of a motor, operators can drag the counter EMF to measure relative position of Hall signals and counter EMF waveform and then adjust the Hall component to achieve the required relative position relationship between the main magnetic field and the inductive magnetic field. However, disadvantages of this method are obvious including poor processability, low overall accuracy, big differences of motor performance, and unfriendly installation.

SUMMARY OF THE INVENTION

In view of the above-described problems, it is one objective of the invention to provide a motor rotor system, in which positions of a rotor's magnetic field and inductive magnetic field precisely correspond. The motor rotor system has excellent batch-to-batch consistency, simple structure, and convenient installation, and is suitable for large batch production and can be controlled using sine-wave driving control methods with a position sensor.

To achieve the above objectives, in accordance with one embodiment of the invention, there is provided a motor rotor system comprising: an axis of rotation, a rotor iron core mounted on the axis of rotation, a permanent magnet, a magnetic ring bracket, and a magnetic ring, wherein the permanent magnet, the magnetic ring bracket, and the magnetic ring are mounted on the rotor iron core; the magnetic ring is sheathed on the magnetic ring bracket; and the magnetic ring bracket is located at one end of the rotor iron core and connected with an end face of the rotor iron core.

In a class of this embodiment, an annular outer side wall of the magnetic ring bracket comprises a locating slot; an inner side wall of the magnetic ring comprises a positioning convex part; the locating slot is embedded with the positioning convex part to enable the magnetic ring to be mounted at the outer side of the magnetic ring bracket.

In a class of this embodiment, the magnetic ring bracket comprises an annular inner ring. A plurality of cooling fan blades extend out of the outer side wall of the annular inner ring, and the annular outer side wall connects with the top side of the cooling fan blades.

In a class of this embodiment, the bottom of the annular outer side wall of the magnetic ring bracket protrudes with a retaining ring, which supports the bottom of the magnetic ring.

In a class of this embodiment, an outer wall of the rotor iron core protrudes with a plurality of convex portions with a groove formed between two adjacent convex portions and the permanent magnet is embedded in the groove.

In a class of this embodiment, the rotor iron core comprises an outer iron core, an inner iron core, and a vibration-reduction device.

In a class of this embodiment, the vibration-reduction device comprises a rubber ring, a rivet, and an end plate, the rubber ring is embedded in a gap formed between the outer iron core and the inner iron core, the rivet passes through the end plate, a through-hole of the rubber ring, and a mounting panel of the magnetic ring bracket and are then riveted with each other.

In a class of this embodiment, the mounting panel of the magnetic ring bracket is arranged at the bottom of the inner side wall of the annular inner ring and a plurality of mounting holes are arranged along the circumference of the mounting panel.

In a class of this embodiment, an outer wall of the outer iron core protrudes with a plurality of convex portions with a groove formed between two adjacent convex portions and the permanent magnet is embedded in the groove. The end face of the outer iron core is arranged with a plurality of positioning holes, the annular inner ring of the magnetic ring bracket protrudes with a plurality of positioning columns, which are embedded in the positioning holes.

Advantages of the invention are summarized below:

1. The magnetic ring bracket is located at one end of the rotor iron core and connected together with the end face of the rotor iron core; the annular outer side wall of the magnetic ring bracket is arranged with a locating slot, the inner side wall of the magnetic ring has a positioning convex part, which is embedded together with the locating slot to enable the magnetic ring to be mounted at the outer side of the magnetic ring bracket. It can effectively ensure that the position of the inductive magnetic field accurately corresponds to that of the main magnetic field. The positions of the main magnetic field and the inductive magnetic field of the motor have been fixed with excellent batch-to-batch consistency. In addition, it meets the requirements of sine wave control of Hall signals and the motor is able to run smoothly with low noise and vibration.

2. The magnetic ring bracket is arranged with an annular inner ring. A plurality of cooling fan blades extend out of the outer side wall of the annular inner ring and the outer side wall of the annular inner ring connects to the top side of the cooling fan blades so as to enable the permanent magnet with strong magnetism to keep a certain distance from the inductive ring and meanwhile to reduce interference of the main magnetic field on the inductive magnetic field. Consequently it improves the measuring accuracy of the rotor position; the cooling fan blades can effectively cool the motor winding and other electronic components, and the structure is compact.
3. The rotor iron core comprises an outer iron core, an inner iron core, and a vibration-reduction device. The vibration-reduction device comprises a rubber ring, a rivet, and an end plate. The rubber ring is embedded in a gap formed between the outer iron core and the inner iron core, the rivet passes through the end plate, and a through-hole of the rubber ring and a mounting panel of the magnetic ring bracket are riveted with each other so as to enable the motor to run smoothly with low noise and vibration.
4. End face of the outer iron core is arranged with a plurality of positioning holes, annular inner ring of the magnetic ring bracket protrudes with a plurality of positioning columns, which are embedded in the positioning holes to ensure the positions between the magnetic ring of the magnetic ring bracket and the permanent magnet of outer iron core are relatively fixed, therefore positions of the main magnetic field and the inductive magnetic field corresponds accurately. In additions, it has excellent consistency, simply structure and friendly installation and is suitable for batch production.

DETAILED DESCRIPTION OF THE EMBODIMENTS

The invention is explained in further detail below with the aid of the example embodiments and attached drawings.

Figure 1:
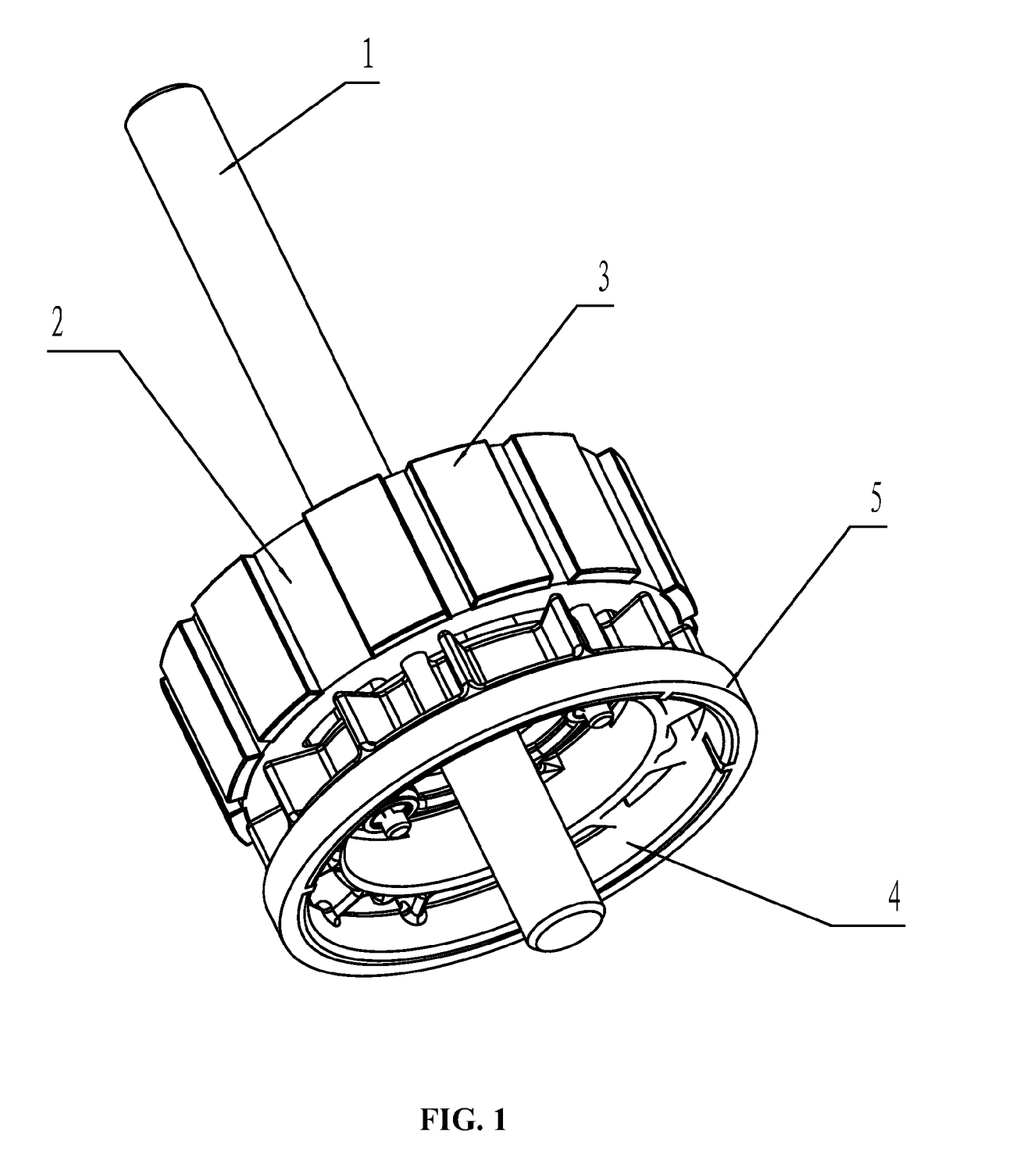
FIG. 1 is a three-dimensional diagram of a rotor system in accordance with one embodiment of the invention.
Figure 2:
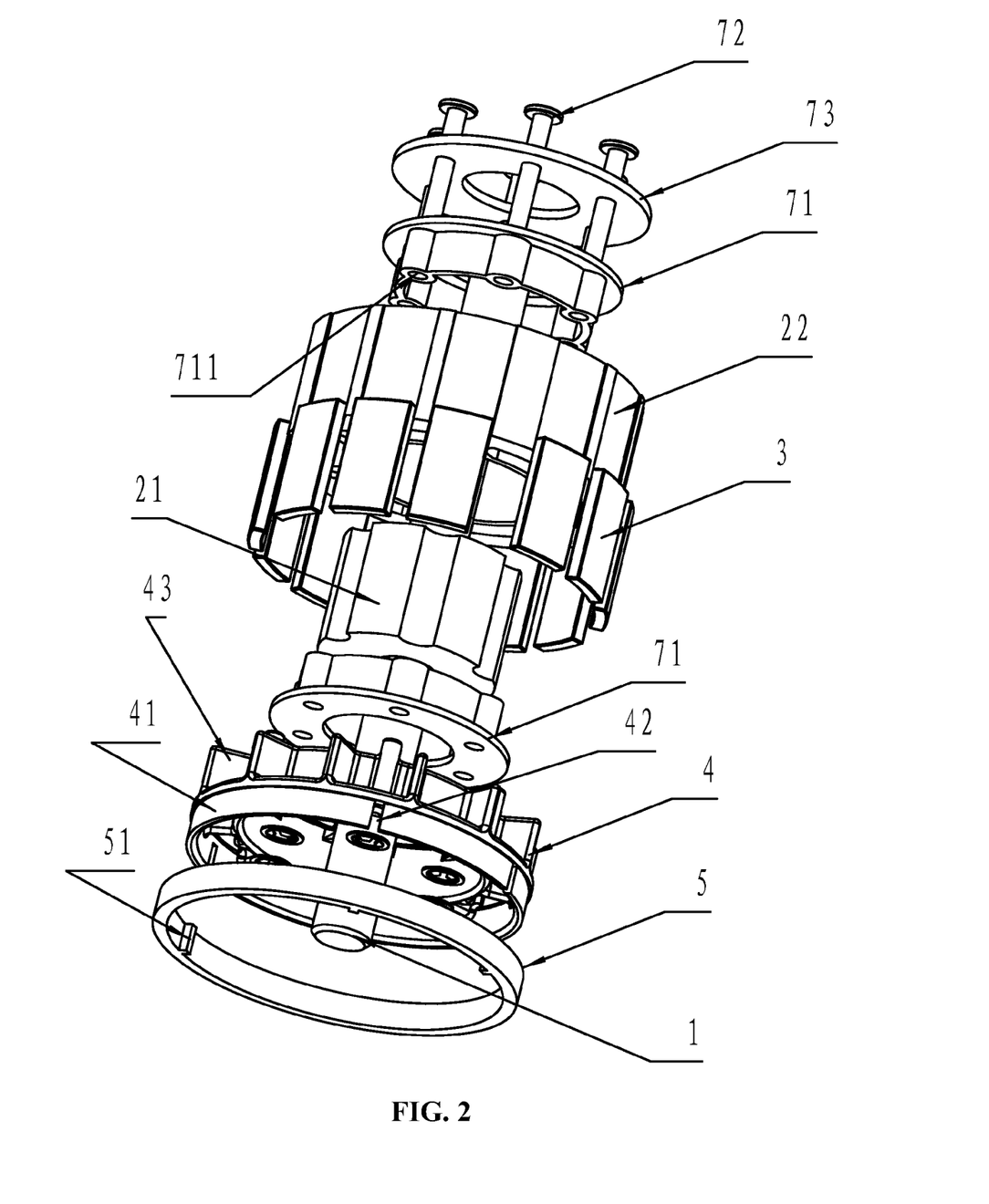
FIG. 2 is an exploded view of a rotor system in accordance with one embodiment of the invention.
Figure 3:
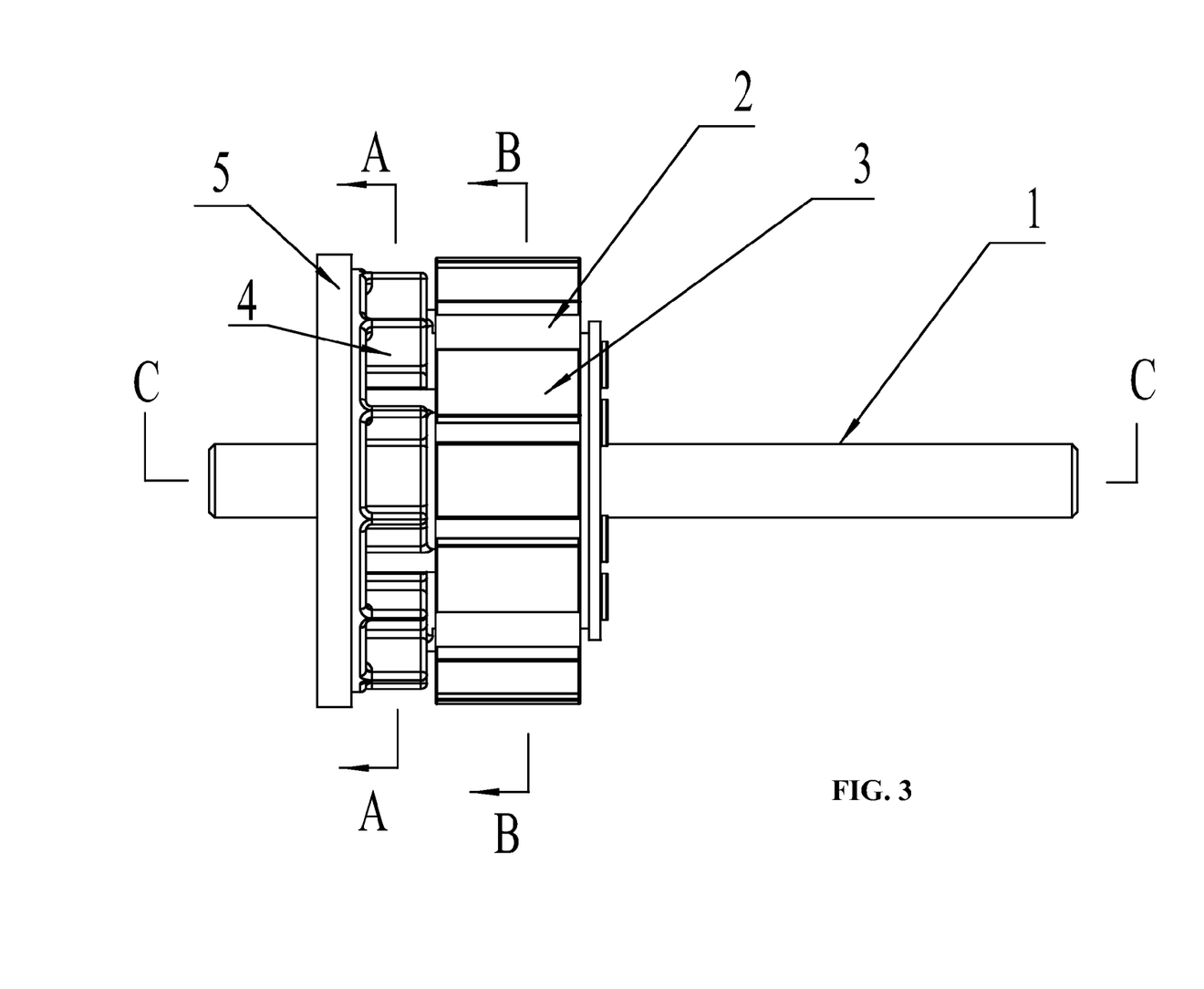
FIG. 3 is a front view diagram of a rotor system in accordance with one embodiment of the invention.
Figure 4:
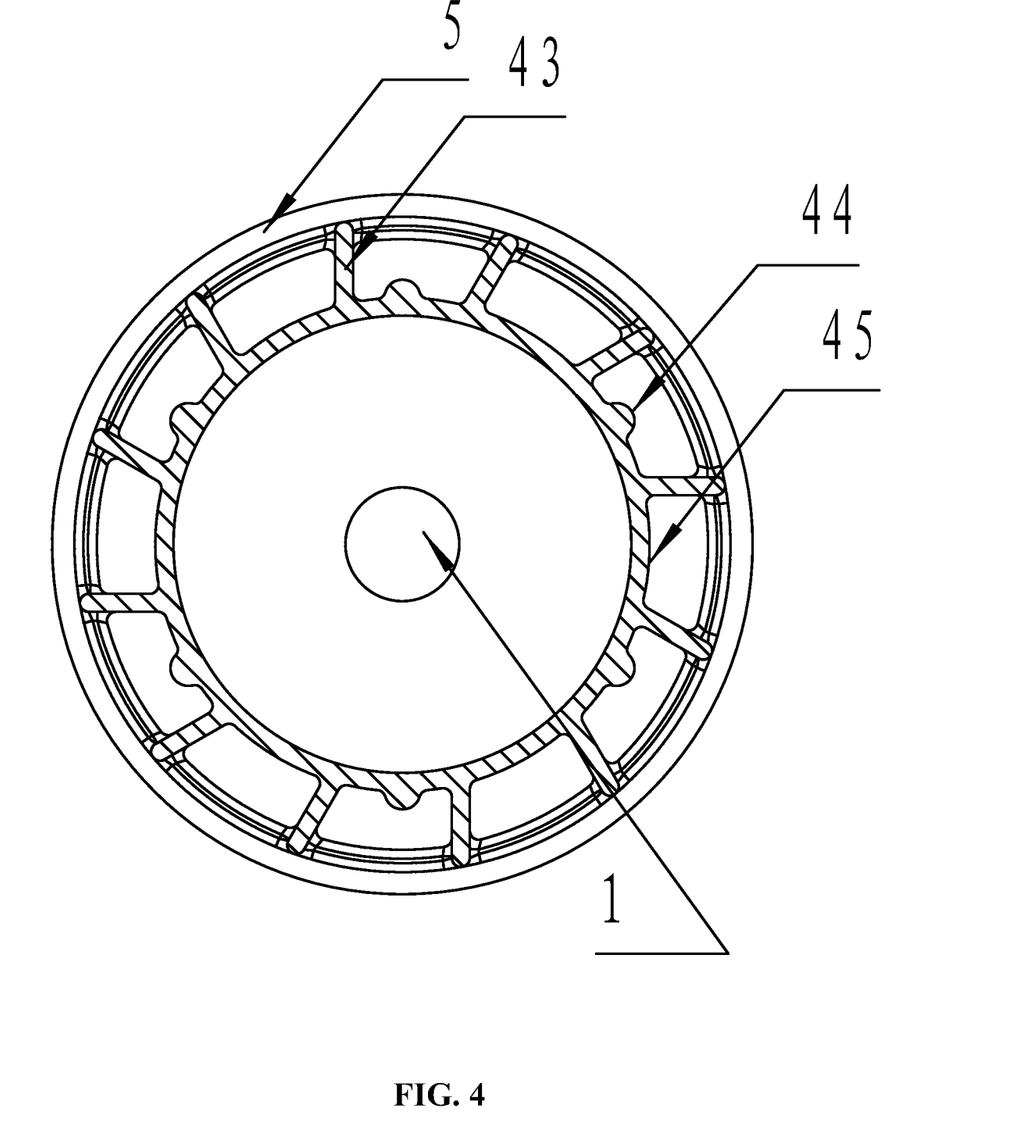
FIG. 4 is an A-A sectional view of FIG. 3.
Figure 5:
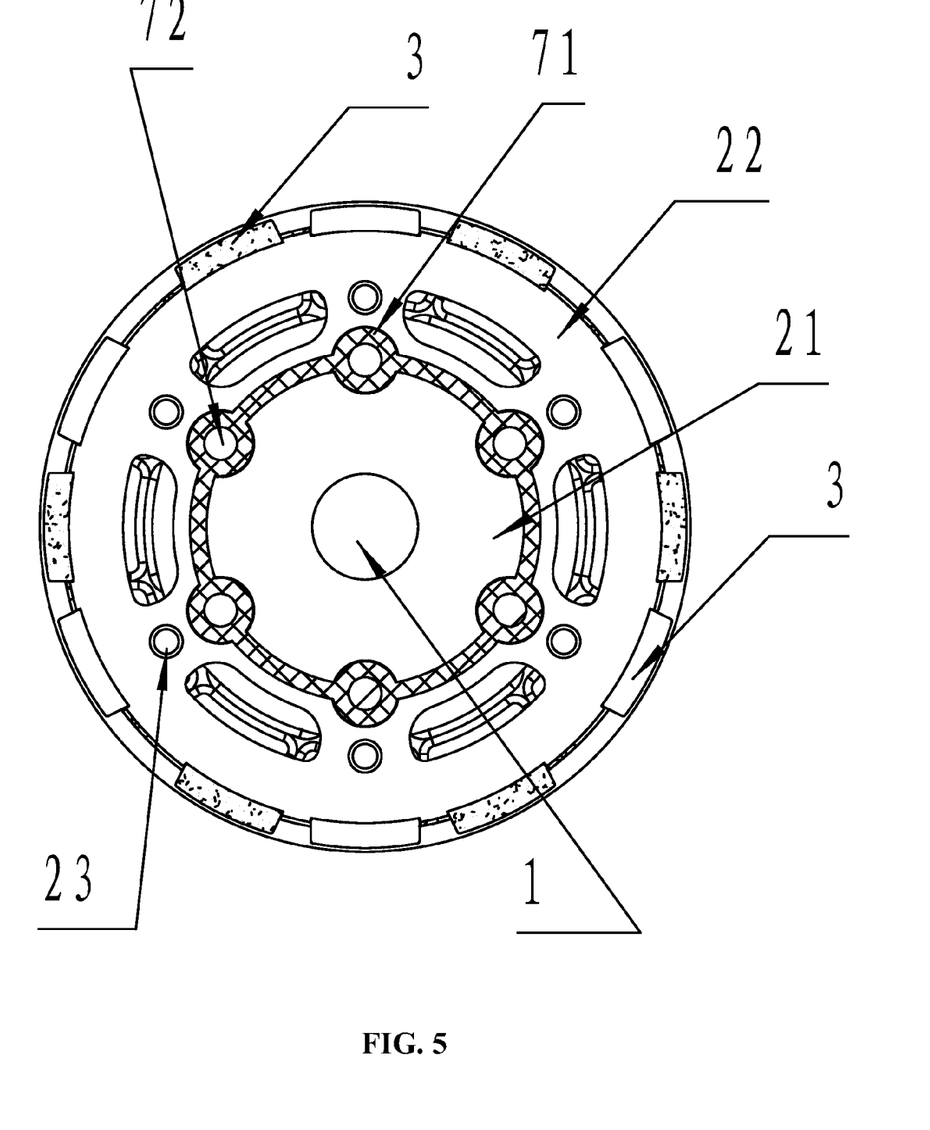
FIG. 5 is a B-B enlarged view of FIG. 4.
Figure 6:
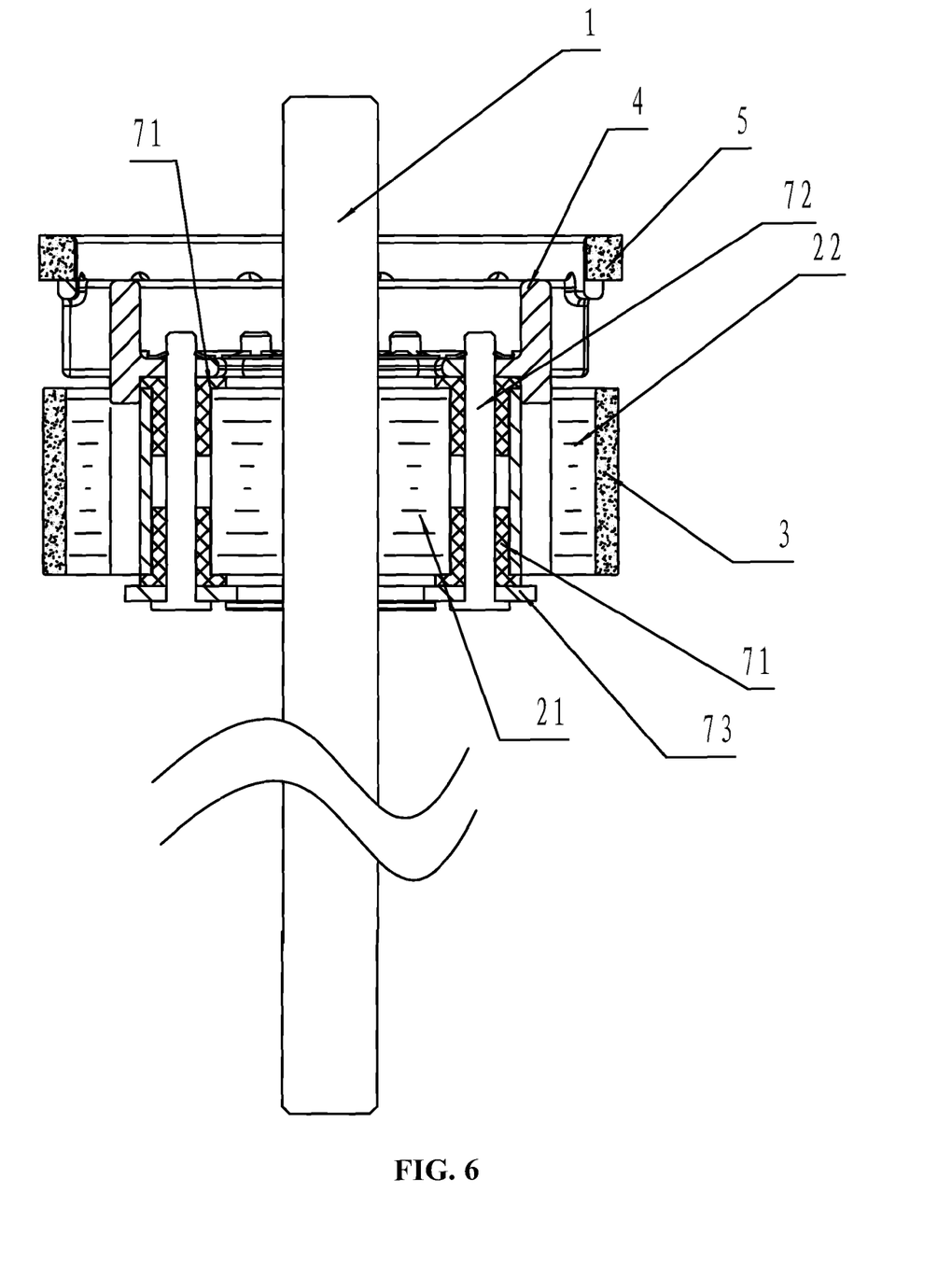
FIG. 6 is a C-C sectional view of FIG. 3.
Figure 7:
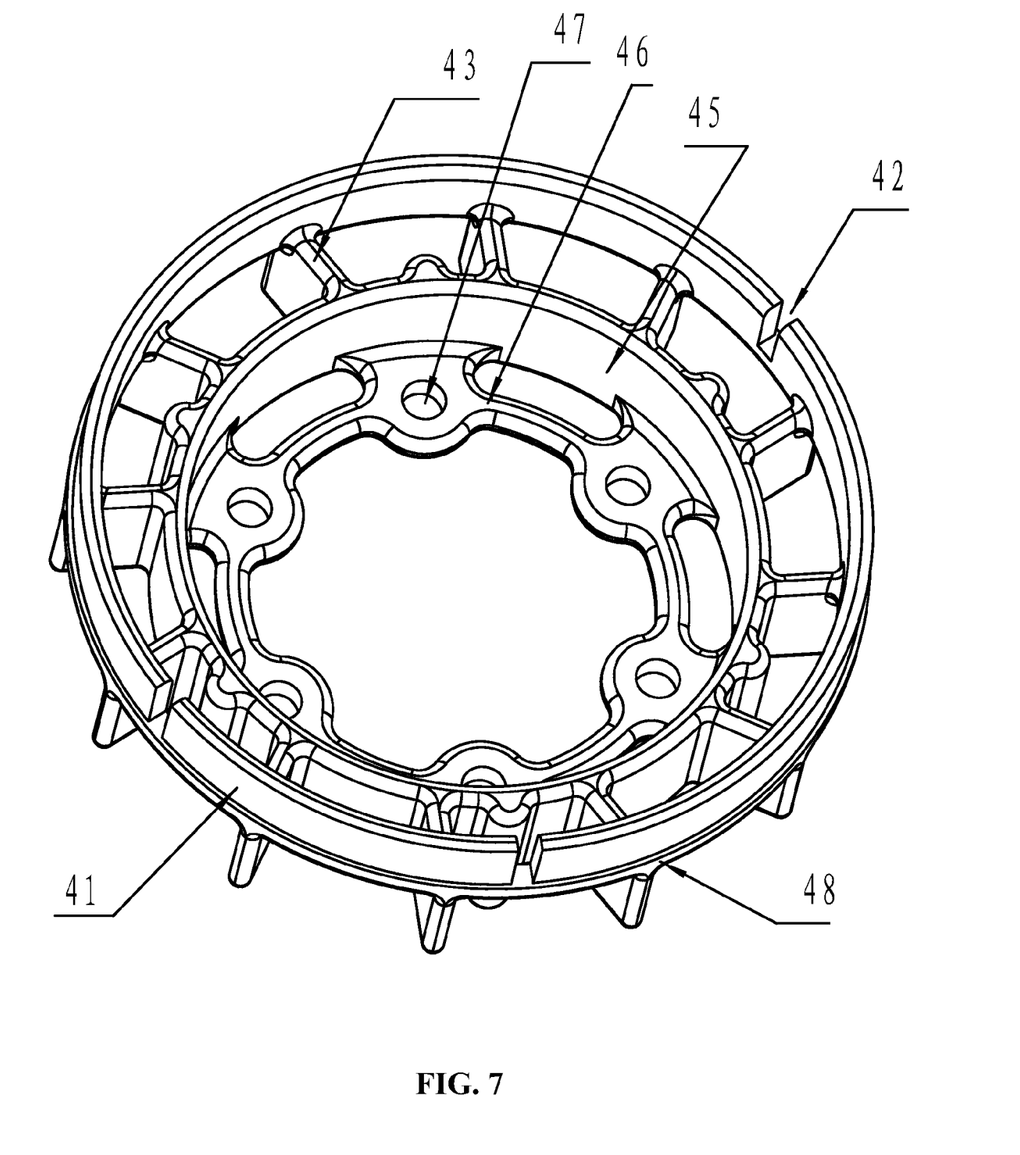
FIG. 7 is a three-dimensional diagram of one angle of a magnetic ring bracket in accordance with one embodiment of the invention.
Figure 8:
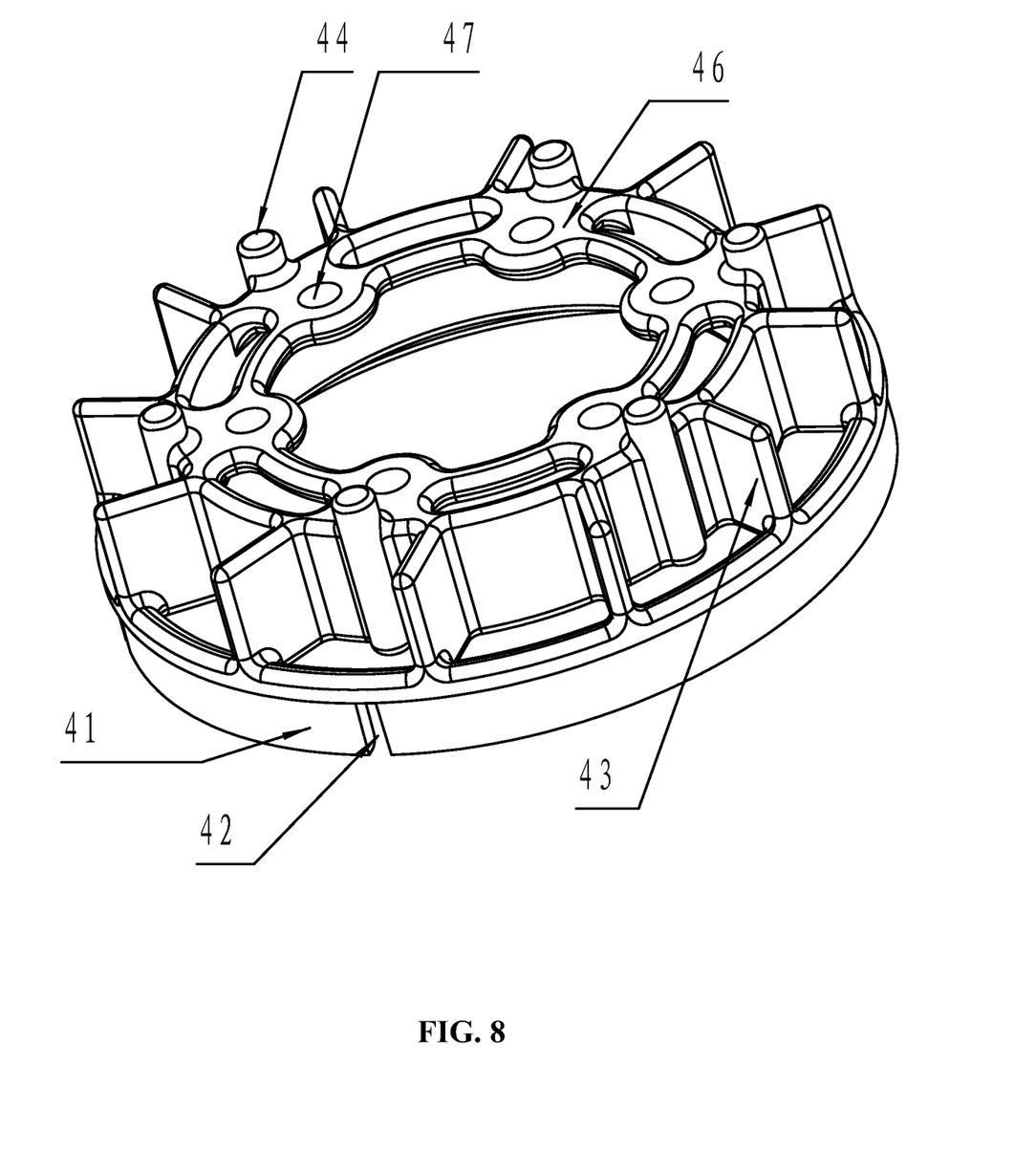
FIG. 8 is a three-dimensional diagram of another angle of a magnetic ring bracket in accordance with one embodiment of the invention.
Figure 9:
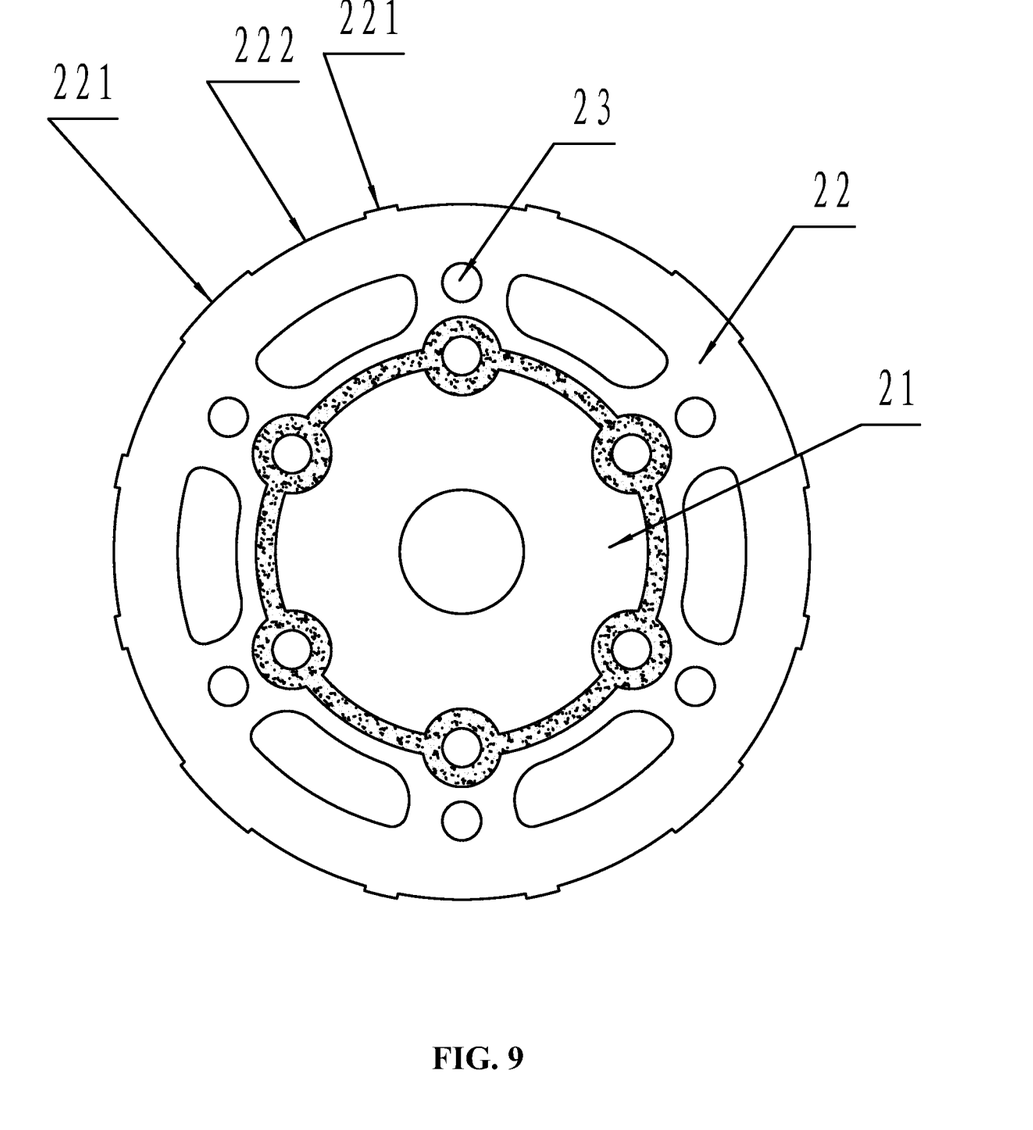
FIG. 9 is a schematic diagram of a rotor iron core in accordance with one embodiment of the invention.

As shown in FIGS. 1-9, a motor rotor system comprises an axis of rotation 1; a rotor iron core 2 mounted on the axis of rotation 1; a permanent magnet 3, a magnetic ring bracket 4, and a magnetic ring 5. The permanent magnet, the magnetic ring bracket, and the magnetic ring are mounted on the rotor iron core 2. The magnetic ring 5 is sheathed on the magnetic ring bracket 4. The magnetic ring bracket 4 is located at one end of the rotor iron core 2 and connected with an end face of the rotor iron core 2. An annular outer side wall 41 of the magnetic ring bracket 4 has a locating slot 42. An inner side wall of the magnetic ring 5 has a positioning convex part 51 and the positioning convex part 51 and the locating slot 42 are embedded together to enable the magnetic ring 5 to be mounted on the outer side of the magnetic ring bracket 4. The magnetic ring bracket 4 is arranged with an annular inner ring 45. A plurality of cooling fan blades 43 extend out of an outer side wall of the annular inner ring 45 and the annular outer side wall 41 connects to the top side of the cooling fan blades 43. The bottom of the annular outer side wall 41 of the magnetic ring bracket 4 protrudes with a retaining ring 48, which supports the bottom of the magnetic ring 5. The outer wall of the rotor iron core 2 protrudes with a plurality of convex portions 221 with a groove 222 formed between two adjacent convex portions 221 and the permanent magnet 3 is embedded in the groove 222. The rotor iron core 2 comprises an outer iron core 22, an inner iron core 21, and a vibration-reduction device. The vibration-reduction device comprises a rubber ring 71, a rivet 72, and an end plate 73. The rubber ring 7 is embedded in a gap between the outer iron core 22 and the inner iron core 21, the rivet 72 passes through the end plate 73, a through-hole 711 of the rubber ring 71, and a mounting hole 47 disposed on a mounting panel 46 of the magnetic ring bracket 4 and are then riveted with each other. The mounting panel 46 of the magnetic ring bracket 4 is arranged at the bottom of the inner side wall of the annular inner ring 45, and the mounting panel 46 is arranged with a plurality of mounting holes 47 along its circumference. The outer wall of the outer iron core 22 protrudes with a plurality of convex portions 221 with a groove 222 formed between two adjacent convex portions 221 and the permanent magnet 3 is embedded in the groove 222. The end face of the outer iron core 22 is arranged with a plurality of positioning holes 23. The annular inner ring 45 of the magnetic ring bracket 4 protrudes with a plurality of positioning columns 44 and the positioning columns 44 are embedded in the positioning holes 23.

Principle of the invention is summarized below. The magnetic ring bracket 4 is located at one end of the rotor iron core 2 and connected with an end face of the rotor iron core 2, the annular outer side wall 41 of the magnetic ring bracket 4 is arranged with the locating slot 42, the inner side wall of the magnetic ring 5 has the positioning convex part 51, the positioning convex part 51 and the locating slot 42 are embedded together to enable the magnetic ring 5 to be mounted on the outer side of the magnetic ring bracket 4. It can effectively ensure that the position of the inductive magnetic field accurately corresponds to that of the main magnetic field. The positions of the main magnetic field and the inductive magnetic field of the motor have been fixed with excellent batch-to-batch consistency. In addition, it meets the requirements of sine wave control of Hall signals, the motor is able to run smoothly with low noise and vibration. The magnetic ring bracket 4 is arranged with the annular inner ring 45, a plurality of cooling fan blades 43 extend out of outer side wall of the annular inner ring 45 and the outer side wall of the annular inner ring 41 connects to the top side of the cooling fan blades 43 to enable the permanent magnet with strong magnetism to keep a certain distance from the inductive ring by the annular inner ring 45 so as to reduce interference of the main magnetic field to the inductive magnetic field and improve measuring accuracy of the rotor position. The cooling fan blades 43 can effectively cool the motor winding and other electronic components, and the structure is compact. The rotor iron core 2 comprises the outer iron core 22, the inner iron core 21 and the vibration-reduction device. The vibration-reduction device comprises the rubber ring 71, the rivet 72, and the end plate 73. The rubber ring 71 is embedded in a gap formed between the outer iron core 22 and the inner iron core 21. The rivet 72 passes through the end plate 73; the through-hole 711 of the rubber ring 71, and the mounting panel 46 of the magnetic ring bracket 4 and are then riveted with each other to enable the motor to run smoothly with low noise and vibration. The end face of the outer iron core 22 is arranged with a plurality of positioning holes 23. The annular inner ring 45 of the magnetic ring bracket 4 protrudes with a plurality of positioning columns 44, and the positioning columns 44 are embedded in the positioning holes 23 to ensure the positions between the magnetic ring 5 of the magnetic ring bracket 4 and the permanent magnet 3 of the outer iron core 22 are relatively fixed. Thus, the positions of the main magnetic field and the inductive magnetic field correspond accurately. In addition, the rotor system has excellent consistency, simply structure, and friendly installation, and is suitable for batch production.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor rotor system, comprising:
   a) an axis of rotation;
   b) a rotor iron core mounted on the axis of rotation;
   c) a permanent magnet;
   d) a magnetic ring bracket; and
   e) a magnetic ring;
   wherein:
   the permanent magnet, the magnetic ring bracket, and the magnetic ring are mounted on the rotor iron core;
   the magnetic ring is sheathed on the magnetic ring bracket;
   the magnetic ring bracket is located at one end of the rotor iron core and connected with an end face of the rotor iron core;
   an annular outer side wall of the magnetic ring bracket comprises a locating slot;
   an inner side wall of the magnetic ring comprises a positioning convex part;
   the locating slot is embedded with the positioning convex part to enable the magnetic ring to be mounted at an outer side of the magnetic ring bracket;
   the magnetic ring bracket comprises an annular inner ring;
   a plurality of cooling fan blades extend out of the outer side wall of the annular inner ring; and
   the annular outer side wall of the magnetic ring bracket connects with a top side of the cooling fan blades.

2. The system of claim 1, wherein a bottom of the annular outer side wall of the magnetic ring bracket protrudes with a retaining ring, the retaining ring supporting the bottom of the magnetic ring.

3. The system of claim 2, wherein an outer wall of the rotor iron core protrudes with a plurality of convex portions with a groove formed between two adjacent convex portions, and the permanent magnet is embedded in the groove.

4. The system of claim 3, wherein the rotor iron core comprises an outer iron core, an inner iron core, and a vibration-reduction device.

5. The system of claim 4, wherein
   the vibration-reduction device comprises a rubber ring, a rivet, and an end plate;
   the rubber ring is embedded in a gap formed between the outer iron core and the inner iron core; and
   the rivet passes through the end plate, a through-hole of the rubber ring, and a mounting panel of the magnetic ring bracket and are then riveted with each other.

6. The system of claim 5, wherein the mounting panel of the magnetic ring bracket is arranged at the bottom of the inner side wall of the annular inner ring and a plurality of mounting holes are arranged along the circumference of the mounting panel.

7. The system of claim 5, wherein
   an outer wall of the outer iron core protrudes with a plurality of convex portions with a groove formed between two adjacent convex portions and the permanent magnet is embedded in the groove;
   the end face of the outer iron core is arranged with a plurality of positioning holes;
   the annular inner ring of the magnetic ring bracket protrudes with a plurality of positioning columns; and
   the positioning columns are embedded in the positioning holes.

\* \* \* \* \*